United States Patent
Deng et al.

(10) Patent No.: US 10,055,464 B2
(45) Date of Patent: *Aug. 21, 2018

(54) RANK-BASED CALCULATION FOR KEYWORD SEARCHES

(71) Applicant: International Business Machines Corporation, Armonk, NY (US)

(72) Inventors: Xiao Di Deng, Beijing (CN); Shuo Li, Beijing (CN); Meng Wan, Beijing (CN); Xin Ying Yang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 279 days.

This patent is subject to a terminal disclaimer.

(21) Appl. No.: 15/049,705

(22) Filed: Feb. 22, 2016

(65) Prior Publication Data

US 2017/0124087 A1    May 4, 2017

Related U.S. Application Data

(63) Continuation of application No. 14/929,574, filed on Nov. 2, 2015.

(51) Int. Cl.
G06F 17/30    (2006.01)

(52) U.S. Cl.
CPC .... G06F 17/3053 (2013.01); G06F 17/30011 (2013.01)

(58) Field of Classification Search
CPC .......... G06F 17/3053; G06F 17/30554; G06F 17/30867; G06F 17/30864; G06F 17/30528; G06F 17/30675; G06F 17/30424; G06F 17/30477
USPC .......................... 707/723, 999.003, 999.005
See application file for complete search history.

(56) References Cited

U.S. PATENT DOCUMENTS

| | | | |
|---|---|---|---|
| 6,055,542 A | 4/2000 | Nielsen et al. | |
| 6,457,026 B1 | 9/2002 | Graham et al. | |
| 8,352,485 B2 | 1/2013 | Dexter et al. | |
| 9,110,975 B1* | 8/2015 | Diligenti | G06F 17/30864 |
| 2005/0071328 A1* | 3/2005 | Lawrence | G06F 17/30867 |
| 2005/0222989 A1* | 10/2005 | Haveliwala | G06F 17/30867 |

(Continued)

FOREIGN PATENT DOCUMENTS

WO    0237223 A2    5/2002

OTHER PUBLICATIONS

Peng et al., "Personal Agent for Highlighting Interesting Words", Proceedings of the First International Conference on Machine Learning and Cybernetics, Nov. 4-5, 2002, pp. 572-577, IEEE.

(Continued)

*Primary Examiner* — Dung K Chau
(74) *Attorney, Agent, or Firm* — Gilbert Harmon, Jr.

(57) ABSTRACT

Embodiments of the present invention provide efficient systems and methods for searching a keyword. Embodiments of the present invention can be used to more quickly and comprehensively search a document for a keyword or phrase, based on the preferences and behaviors of a user, so that the returned results to the user are ranked in order of the preferences of the user. By factoring in user data such as time spent on certain content and highlighted content, the system is able to more efficiently return preferred results of a user of a keyword search.

7 Claims, 6 Drawing Sheets

(56) References Cited

U.S. PATENT DOCUMENTS

2007/0271255 A1* 11/2007 Pappo ............... G06F 17/30864
2008/0248788 A1* 10/2008 Smith ................ H04M 3/4878
                                                          455/414.3
2009/0019033 A1* 1/2009 Lee .................. G06F 17/30702
2013/0124515 A1   5/2013 Ghimire

OTHER PUBLICATIONS

Ying et al., "User-Interested-Keywords Set Discovery Using Rough Sets for Intelligent Information Agents", 2001 International Conferences on Info-tech and Info-net, Oct. 29-Nov. 1, 2001, pp. 61-66, vol. 4, IEEE.

U.S. Appl. No. 14/929,574, filed Nov. 2, 2015, Entitled "Rank-Based Calculation for Keyword Searches".

List of IBM Patents or Patent Applications Treated as Related, Dated Feb. 22, 2016, 2 pages.

* cited by examiner

RANK-BASED CALCULATION FOR KEYWORD SEARCHES

BACKGROUND OF THE INVENTION

The present invention relates generally to the field of computerized data processing, and more particularly to a rank-based calculation for keyword searches.

The growth of computing and information technology has enabled a user to easily access information stored within a large number of documents (e.g., a text document, PDF, source code editor, etc.) at different locations, such as a local hard drive of a computing device or a remote web server on the Internet. However, quickly locating the specific information sought by a user within a document remains a challenge.

When reading a document, a user may be more interested in some parts of the text than other parts of the text. Additionally, a particular user may prefer to read certain parts first, or to only be directed to the parts of the document of interest to the particular user. For example, different users who search the keyword index of a programming manual may have differing preferences; application users may prefer to search how to use the index, system administrators may prefer to search how to manage the index, and database developers may prefer to search the index catalog table.

In order to view certain parts of a document, certain tools such as a 'Find' function, are commonly used, which allow a user to type in a word or phrase, and each instance of that word or phrase may be highlighted within the document. A user may then click a 'next' button, which allows the user to move through each instance of the word or phrase contained in the document in a step-wise manner, in order to find the specific information or section for which the user is searching. However, in many instances, a user does not always want to find all of the matched words in one search, rather the user may prefer to find the matching word or phrase within a specific scope or context of the document.

In many searches, some paragraphs or sentences may get more attention than others. There is a need for an improvement to the keyword search, including adding additional contextual parameters, in order to make the keyword search calculation more accurate and efficient for each user, based on the most common search behaviors and preferences of each user. It is desirable to have a system and method for directing a particular user to a specific section of interest within a document, without the need for the user to step through each instance of a searched keyword or phrase.

SUMMARY

According to an embodiment of the present invention, a method for keyword searching is provided. The method comprises collecting user information associated with a keyword search, wherein the user information comprises object search information, holding time information, and selecting time information. The method further comprises storing the collected user information associated with the keyword search in a memory and receiving, by one or more computer processors, an indication of a search of content for at least one keyword. The method comprises determining whether the at least one keyword is associated with the collected user information associated with the keyword search in the memory and responsive to determining that the at least one keyword is associated with the collected user information associated with the keyword search in the memory, calculating a rank for the at least one keyword.

Another embodiment of the present invention provides a computer program product for keyword searching, based on the method described above.

Another embodiment of the present invention provides a computer system for keyword searching, based on the method described above.

This may have the advantage that a rank-based calculation for a keyword search can be performed with high efficiency, taking into consideration, not just the interests of the user, but also the behaviors and preferences of a user by using the selected behavioral search factors, in order to find what the user prefers to view. Because each word has its own priority, the search performed is not by sequence of appearance of that word, but rather by the most important words ranked first. As keywords are searched by priority of importance to the particular user, only those matched keywords which the user prefers to view based on the past preferences and behaviors of the user are returned during the rank-based keyword search calculation.

DETAILED DESCRIPTION

Embodiments of the present invention provide systems and methods for a rank-based search for documents, in order to direct a user to the content that the user anticipates viewing, by taking into consideration a user's search behaviors and preferences. Embodiments of the present invention provide systems and methods to save information which is useful in the rank-based calculation, including the object search information, holding time information, and selecting time information. Embodiments of the present invention additionally provide systems and methods for making a rank-based calculation of a received keyword(s), based on the saved information (i.e., object search, holding time, and selecting time information).

Embodiments of the invention may have the advantage that the system makes a comprehensive evaluation of multiple search factors, taking into consideration the most common search behaviors of a user, helping a user to more efficiently find a word that the user is interested in viewing. Because each word has its own priority, the search performed is not by sequence of appearance of that word, but rather by the most important words ranked first. Embodiments of the invention may be used with existing computing device technologies, and may be implemented as a plug-in, or may be implemented as a separate feature in any static document (e.g., as a new feature of the 'Find' function). As keywords are searched by priority of importance to the particular user, only those matched keywords which the user prefers to view based on the past preferences and behaviors of the user are returned during the rank-based keyword search calculation.

Embodiments of the present invention may also have the advantage that the system calculation module may improve its accuracy and efficiency in calculations over time, with each use of the module. In some embodiments, a different color of highlighting is used, in order to help a user efficiently locate a word that was searched by the user.

Figure 1:
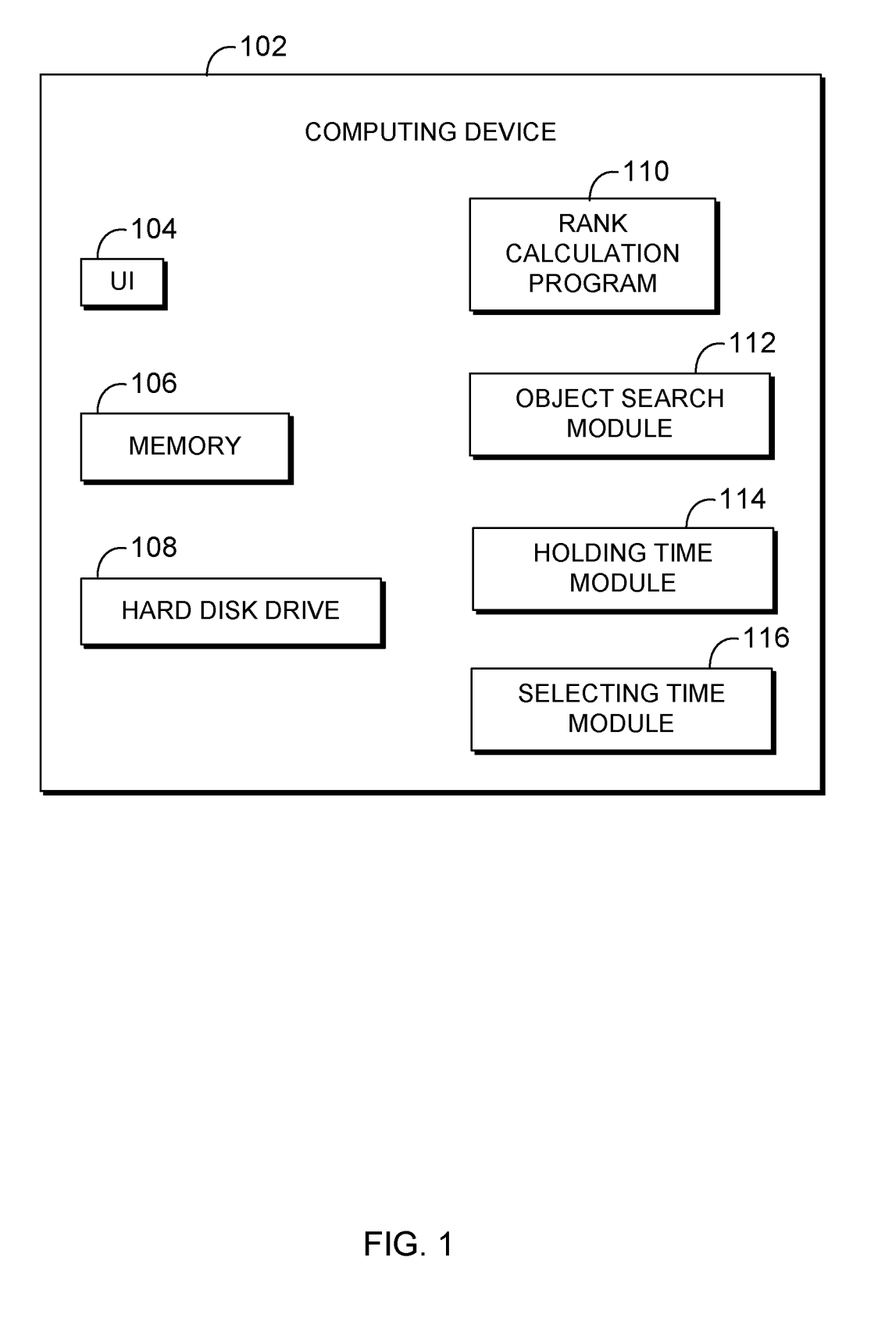
FIG. 1 depicts a block diagram illustrating a computing device, in accordance with an embodiment of the present invention.

The present invention will now be described in detail with reference to the Figures. FIG. 1 depicts a block diagram illustrating a computing device, generally designated 102, in accordance with an embodiment of the present invention. Modifications to computing device 102 may be made by those skilled in the art without departing from the scope of the invention as recited by the claims. In an exemplary embodiment, computing device 102 includes user interface (UI) 104, memory 106, hard disk drive 108, rank calculation program 110, object search module 112, holding time module 114, and selecting module 116.

In various embodiments of the present invention, computing device 102 can be a laptop computer, a tablet computer, a netbook computer, a personal computer (PC), a desktop computer, a personal digital assistant (PDA), a smart phone, a thin client, a wearable device, or any programmable mobile electronic device capable of executing computer readable program instructions. Computing device 102 may include internal and external hardware components, as depicted and described in further detail with respect to FIG. 5.

UI 104 may be, for example, a graphical user interface (GUI) or a web user interface (WUI) and can display text, documents, web browser windows, user options, notifications, application interfaces, and instructions for operation, and includes the information (such as graphic, text, and sound) a program presents to a user and the control sequences the user employs to control the program. UI 104 is capable of receiving data, user commands, and data input modifications from a user. UI 104 is also capable of communicating with rank calculation program 110, object search module 112, holding time module 114, and selecting module 116, and displaying the results of keyword searches based on data obtained from rank calculation program 110, object search module 112, holding time module 114, and selecting module 116. In some embodiments, UI 104 can be integrated with rank calculation program 110.

In this exemplary embodiment, memory 106 is computer readable storage media. Memory 106 may include random access memory (RAM). Memory 106 stores gathered information and calculation information from rank calculation program 110. Keywords may be retrieved from memory 106 upon a request from a user, and memory 106 is continuously updated as user information is continuously gathered and rank calculations based on the user information are continuously performed.

In this exemplary embodiment, hard disk drive 108 is computer readable storage media. While as depicted in FIG. 1, hard disk drive 108 is located locally on computing device 102, in other embodiments, hard disk drive 108 (or any other suitable storage media) may be located remotely, and accessible, for example, over a network, such as the Internet. Hard disk drive 108 receives information flushed from memory 106 in batches over a predetermined time interval. Hard disk drive 108 stores user information and receives new entries when new information, such as a new keyword, is calculated.

In this exemplary embodiment, rank calculation program 110 uses three information modules to perform a rank-based keyword calculation (i.e., object search module 112, holding time module 114, and selecting module 116). In other embodiments, other information modules and/or parameters may be implemented with rank calculation program 110, in order to further refine a keyword calculation, based on the preferences and/or behaviors of a user.

Object search module 112 gathers information associated with a user search (i.e., 'find' function) in which the user stops at a keyword when using the 'next' function to scroll through. In this exemplary embodiment, when a user stops at a certain keyword, this keyword is marked as an object search.

Holding time module 114 gathers information associated with the time spent by a user reading or viewing a certain part of a document. When a user stops at a certain section of the document (i.e., the user is reading that section), holding time module 114 notes the time spent on the section (e.g., more time spent on a section may mean the user prefers to read that section and others similar to the content of that section).

Selecting module 116 gathers information associated with parts of the document highlighted by a user when viewing the document. By receiving a section of the document that is highlighted, selecting module 116 treats the selected sections as more important to the user.

Rank calculation program 110 is a software program which calculates rank-based calculations for keyword searches received from a user. In this exemplary embodiment, rank calculation program 110 uses the information gathered from object search module 112, holding time module 114, and selecting module 116 to calculate an adjusted rank for keywords received from a user during a search, factoring in the preferences and behaviors of the user. Rank calculation program 110 can learn user behaviors over time and update its keyword calculations based on those behaviors.

Figure 2A:
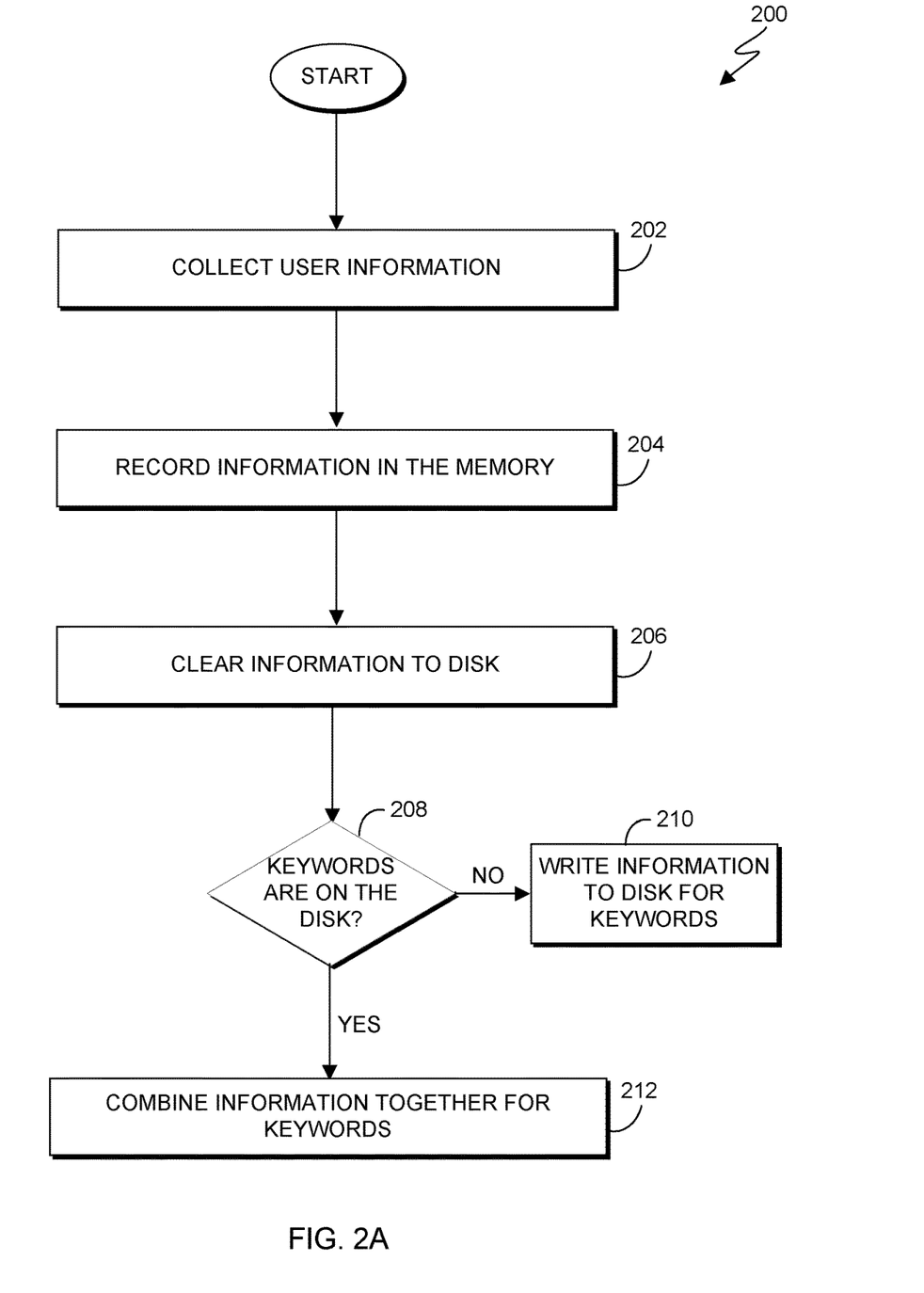
FIG. 2A depicts a flowchart illustrating operational steps for saving information for a rank calculation, in accordance with an embodiment of the present invention.

FIG. 2A depicts flowchart 200 illustrating operational steps of rank calculation program 110 for saving information for the rank calculation, in accordance with an embodiment of the present invention.

In step 202, rank calculation program 110 collects user information. In this exemplary embodiment, the system collects the information which is useful for the user behavior ratios factored into the rank-based calculation. Any factor's change will be immediately fed into the rank calculation model as an input. The user's behavior will refresh the factor's weight in calculating the rank. Information that is collected may include the following factors: object search, holding time, and selecting time. In this embodiment, the ratio for the object search increases after each search for the factor. However, the object search is adjusted with the life cycle ratio for decay of the historic data. Therefore, an early behavior for the object search may hold a less important role. The ratio for holding time increases with holding at a keyword. Additionally, the holding time factor is adjusted with the life cycle ratio for decay of the historical data. The ratio for selecting time increases dependent on how many times a part is highlighted or marked with comments. The same decay will occur using the life cycle for selecting time (life cycle ratio is discussed further with respect to FIG. 3).

In step 204, rank calculation program 110 records the information in the memory. In this exemplary embodiment, when rank calculation program 110 receives the user information, including the object search, holding times, and selecting times, that information is stored in the memory (e.g., memory 106), in order to reduce load on the computational resources.

In step 206, rank calculation program 110 clears the information frequently to the disk. In this exemplary embodiment, rank calculation program 110 clears the information stored in memory 106 frequently (e.g., at a predetermined time interval) to hard disk drive 108, in batches. A batch I/O saves the total cost for disk writing.

In step 208, rank calculation program 110 determines whether the keywords are on the disk. In this embodiment, when rank calculation program 110 is clearing the information to hard disk drive 108, the system first checks whether the cleared keyword information is already being stored on hard disk drive 108.

If, in step 208, rank calculation program 110 determines that the keywords are not already on hard disk drive 108, then in step 210, rank calculation program 110 writes the information to the disk, for the keywords. In this exemplary embodiment, rank calculation program 110 writes the information for the keywords as a new entry on hard disk drive 108.

If, in step 208, rank calculation program 110 determines that the keywords are on the hard disk drive 108, then, in step 212, rank calculation program 110 combines the information together for the keywords. In this exemplary embodiment, if the keywords information is already on hard disk drive 108, then the system combines the existing information and the incoming information together for the keywords and stores the combined information for later retrieval.

Figure 2B:
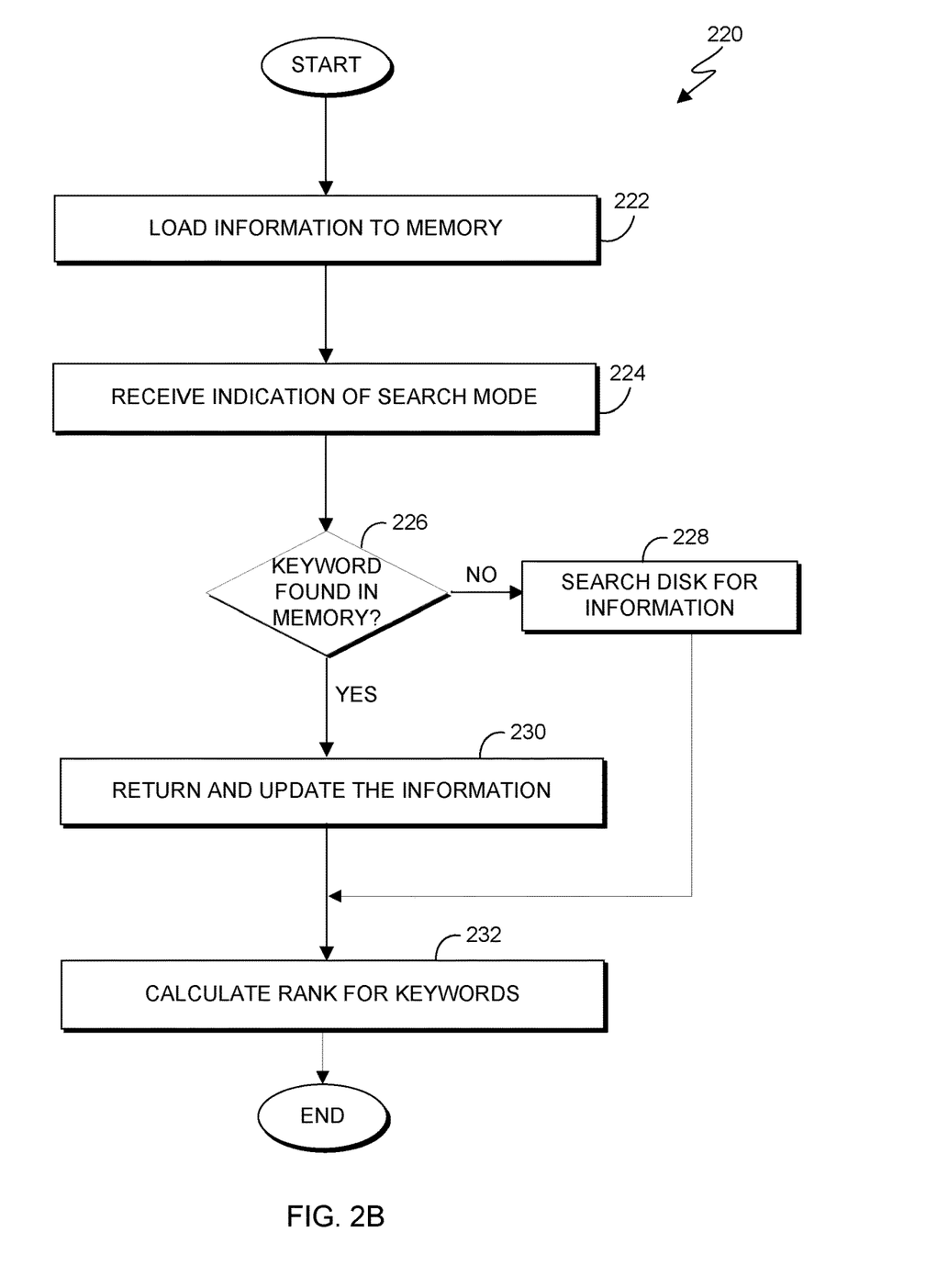
FIG. 2B depicts a flowchart illustrating operational steps for ranking the keywords based on the saved information, in accordance with an embodiment of the present invention.

FIG. 2B depicts flowchart 220 illustrating operational steps of rank calculation program 110 for ranking the keywords based on the information stored in FIG. 2A, in accordance with an embodiment of the present invention.

In step 222, rank calculation program 110 loads the information file to the memory. In this exemplary embodiment, the system loads the information stored on hard disk drive 108 into memory 106 first, and subsequently waits for a search request from a user.

In step 224, rank calculation program 110 receives an indication that the search mode is being used by a user. In this exemplary embodiment, a user may choose to commence a new search, and activates a method of a search mode. For example, activating the method of a search mode may depend on the program (e.g., plug-in, built-in to existing documents, separate add-on).

In step 226, rank calculation program 110 determines whether the keywords are found in the memory. In this exemplary embodiment, rank calculation program 110 looks for the information for the keywords in the memory 106, responsive to receiving a search request from a user. Rank calculation program 110 scans the information in memory 106 for matching information related to the searched keyword.

If, in step 226, rank calculation program 110 determines that the keywords are found in the memory, then, in step 230, rank calculation program 110 returns and updates the information. In this exemplary embodiment, if the information the user needs is in the memory, then the information is returned directly to the requesting user, and is updated in the memory based on the recent search request.

If, in step 226, rank calculation program 110 determines that the keywords are not found in the memory, then, in step 228, rank calculation program 110 searches for the requested information on hard disk drive 108, and also updates the information in memory 106, based on the recent user search request.

In step 232, rank calculation program 110 calculates the rank for the keywords. In this exemplary embodiment, to implement the rank calculation model, a lightweight component is added to monitor a user's behavior of an object search, holding time, and selecting time, in the background. This model runs in the text application. The rank calculation is built into a mathematical model, and the following formula is used to adjust the search ratio:

$$\text{Ratio} = (\Sigma \text{ Object\_Search} \times \text{Life\_Cycle}) + \left( \Sigma \frac{\text{Keep\_Time}}{\text{Time\_Weight}} \times \text{Life\_Cycle2} \right) + (\Sigma \text{ Select\_Times} \times \text{Select\_Ratio} \times \text{Life\_Cycle3})$$

Formula 1

Where ratio is the final ratio for the search order; object search represents that the time for the word is ranked as an object search; keeping_time is the time range during which a user remains on a particular section; time_weight is the weight used for adjusting the ratio (the weight may be further adjusted with each use); select_ratio is the adjusting ratio for the final ratio (the ratio may be further adjusted with each use); life_cycle is the ratio of decay over time (further depicted in FIG. 3) and is different for each of object_search, keep_time, and select_times. Life_cycle1 decays when a certain word has been ranked as object search a predetermined number of times (e.g., 10 times) and can be adjusted over time; life_cycle2 decays with a predetermined time elapse (e.g., 5 hours) and can be adjusted over time; and life_cycle3 decays when a certain word has not been ranked as select part a predetermined number of times (e.g., 5 times) and can be adjusted over time with each use.

In this exemplary embodiment, the calculation requires very little computational load for monitoring and calculating the rank ratio. Rank calculation program 110 may be launched simultaneously with the launch of a text application. In some embodiments, the information for the rank calculation is stored for a predetermined amount of time, and the unused historical data is cleared at predetermined times. This reduces the resource consumption during the rank calculation.

In some embodiments, rank calculation program 110 can replace the functions of a traditional 'find' function in a text application. In other embodiments, rank calculation program 110 can be installed as a plug-in with existing word documents, PDFs, Symphony®, Eclipse, or any other source code editors. The plug-in feature can be implemented based on existing 'forward' and 'backward' find functions, while also accounting for the rank information based on a user's behaviors in the search calculation. In some embodiments, if no user information is available, the plug-in recognizes this, and reverts to performing the traditional 'forward' and 'backward' find functions. In other embodiments, rank calculation program 110 can be installed as a new feature into any static text document, for example, as a new feature of word documents or Adobe® PDF.

Accordingly, by performing the operations of FIGS. 2A and 2B, a rank-based calculation for a keyword search can be performed with high efficiency, taking into consideration the behaviors and preferences of a user by using the above three search factors, in order to find what the user prefers to view. Additionally, the rank calculation program is flexible, and can be extended dynamically to many different searching options and situations, including the addition of other factors to the rank calculation.

Figure 3:
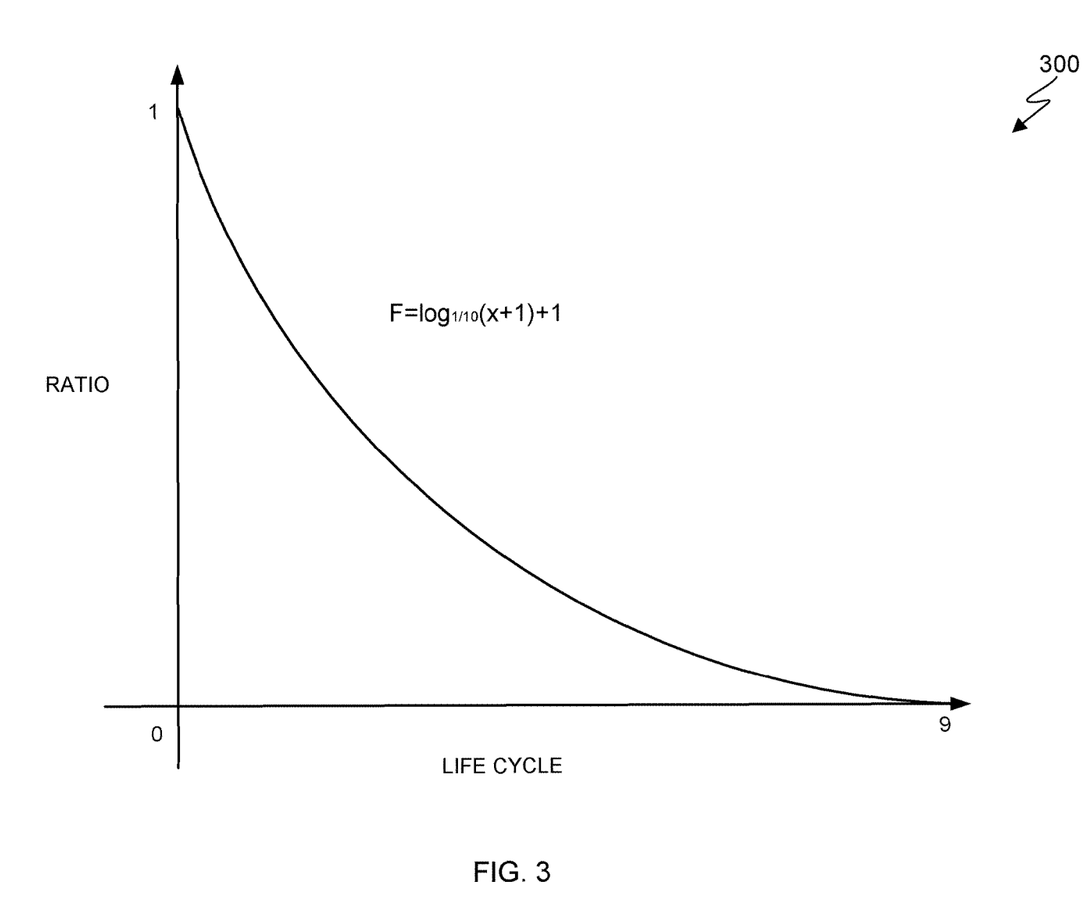
FIG. 3 depicts an example decay curve illustrating the decay of the ratio over time for the implemented factors, in accordance with an embodiment of the present invention.

FIG. 3 depicts an example decay curve illustrating the decay of the ratio over time for the implemented factors, in accordance with an embodiment of the present invention.

The rank calculation component uses the mathematical model from Formula 1, however, any new factor can also added to the model, which optimizes the results from the model over time. The key of the life cycle from Formula 1 brings in the decay effect for each of the factors, and can decay the effect of some factor to the rank due to a decaying exponential, as seen in the exponential decay curve of FIG. 3.

In this exemplary embodiment, a decay curve is used in calculating the life cycle ratio of each of the factors, using the following:

$$F = \log_{1/10}(x+1) + 1 \qquad \text{Formula 2}$$

Where the values for the life cycle and the ratio for each of the factors are calculated in the following:

TABLE 1

| Life Cycle | 0 | 1 | 2 | 3 | 4 | 5 | 6 | 7 | 8 | 9 |
|---|---|---|---|---|---|---|---|---|---|---|
| Ratio | 1.0000 | 0.6990 | 0.5229 | 0.3979 | 0.3010 | 0.2218 | 0.1549 | 0.0969 | 0.0458 | 0.00 |

Thus, as can be seen from FIG. 3 and Table 1, for each of the factors, the ratio increases for each search or use of the factor.

Figure 4:
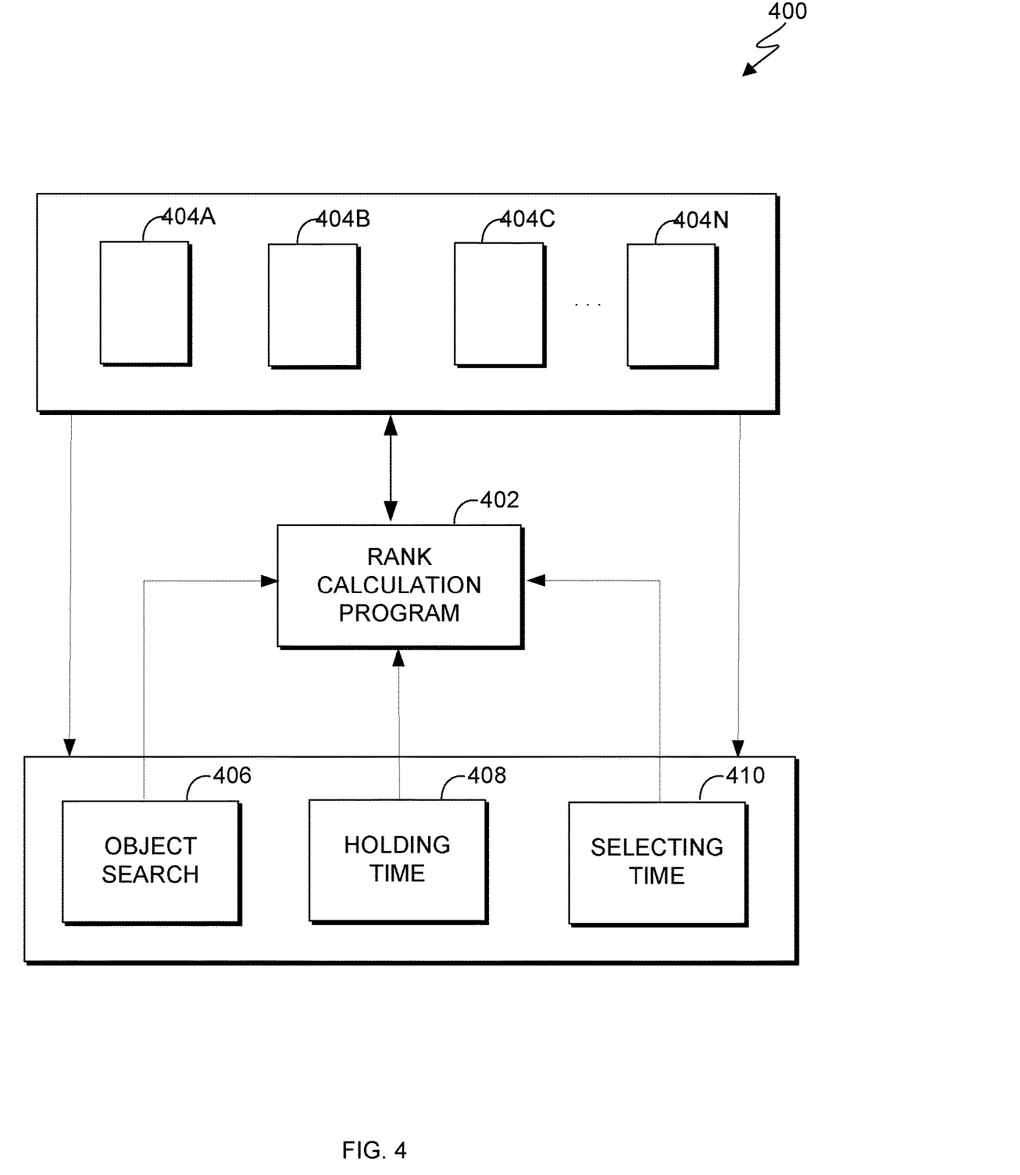
FIG. 4 depicts a functional block diagram illustrating an information feedback mechanism of the rank-based calculation program, in accordance with an embodiment of the present invention.

FIG. 4 depicts a functional block diagram illustrating an information feedback mechanism of the rank calculation program 110, in accordance with an embodiment of the present invention.

As depicted in FIG. 4, the three information factors (i.e., object search 406, holding time 408, and selecting time 410) feedback any change in information to rank calculation program 402 as an input. Object search 406, holding time 408, and selecting time 410 receive keyword and search information from user interfaces (UIs) 404A-N. The user's behavior received at UIs 404A-N refreshes each of the factor's weight in calculating the rank at rank calculation program 402. Rank calculation program 402 outputs the results of a rank calculation to UIs 404A-N.

Figure 5:
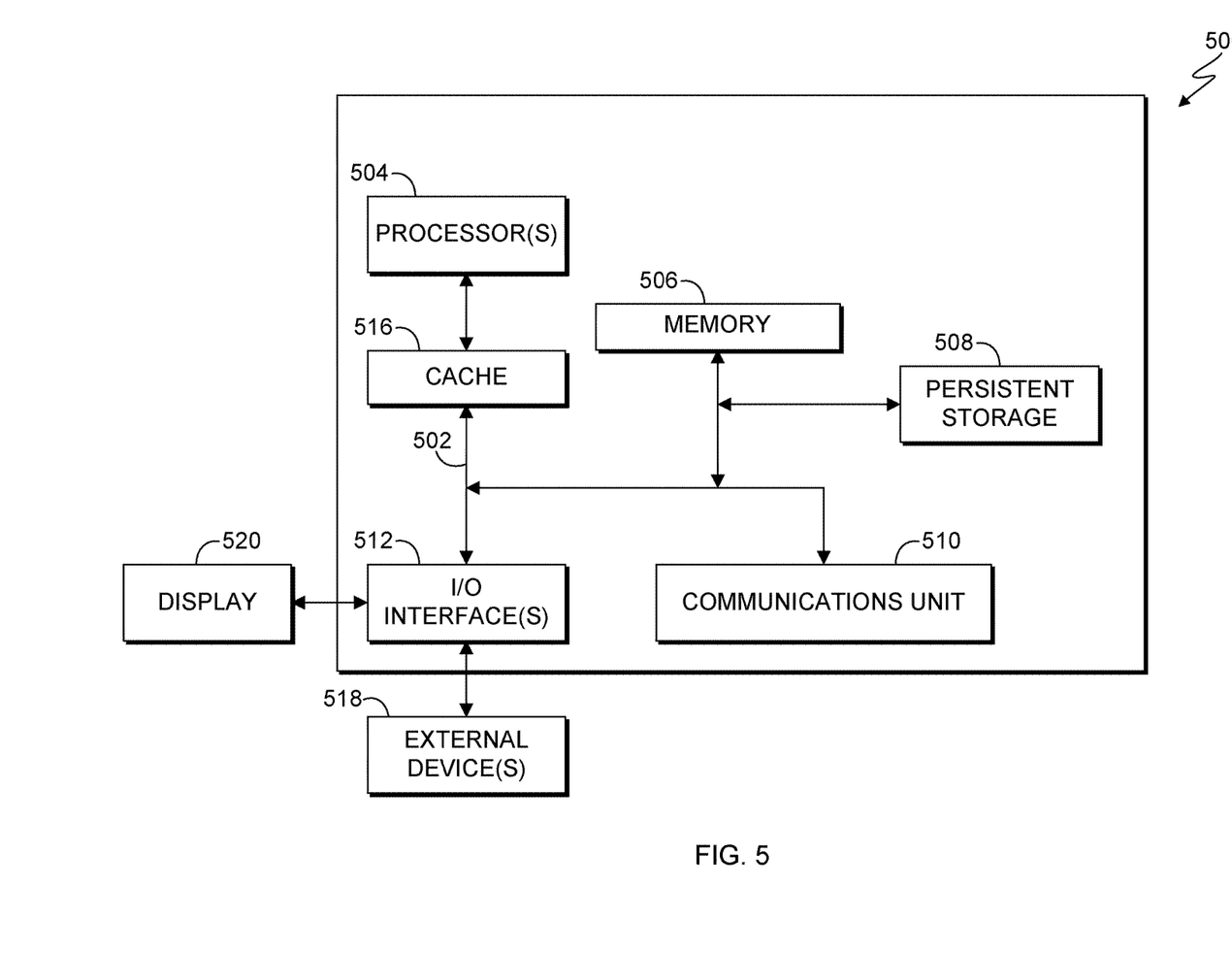
FIG. 5 depicts a block diagram of components of a computing device, in accordance with an illustrative embodiment of the present invention.

FIG. 5 is a block diagram of internal and external components of a computing device, generally designated 500, which is representative of the computing device of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, cache 516, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of a network. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for keyword searching, the method comprising:
    collecting, by one or more computer processors, user information associated with a keyword search, wherein the user information comprises object search information, holding time information, and selecting time information, wherein the selecting time information comprises information associated with a section of a document highlighted by a user when viewing the document;
    storing, by one or more computer processors, the collected user information associated with the keyword search in a memory;
    receiving, by one or more computer processors, an indication of a search of content for at least one keyword;
    determining, by one or more computer processors, whether the at least one keyword is associated with the collected user information associated with the keyword search in the memory; and
    responsive to determining that the at least one keyword is associated with the collected user information associated with the keyword search in the memory, calculating, by one or more computer processors, a rank for the at least one keyword.

2. The method of claim 1, further comprising:
    responsive to determining that the at least one keyword is not associated with the collected user information associated with the keyword search in the memory, searching, by one or more computer processors, a hard disk for information associated with the at least one keyword.

3. The method of claim 1, further comprising:
    writing, by one or more computer processors, the stored collected user information associated with the keyword search in the memory to a hard disk at a predetermined time interval.

4. The method of claim 1, further comprising:
    updating, by one or more computer processors, the collected user information associated with the keyword search in the memory, based on a user search request.

5. The method of claim 1, wherein calculating a rank for the at least one keyword comprises:
    determining, by one or more processors, a life cycle for each of: an object search, a holding time, and a selecting time; and
    adjusting, by one or more processors, a ratio for each of the object search, the holding time, and the selecting time.

6. The method of claim 1, wherein the object search information comprises information associated with a user stopping at a keyword within a document.

7. The method of claim 1, wherein the holding time information comprises information associated with a time spent by a user reading a certain part of a document.

* * * * *